United States Patent [19]
Stotz et al.

[11] Patent Number: 5,928,121
[45] Date of Patent: *Jul. 27, 1999

[54] ADJUSTABLE DEFLECTION ROLL

[75] Inventors: Wolf Gunter Stotz, Ravensburg;
Andreas Meschenmoser, Horgenzell;
Johannes Geromiller, Fronreute, all of Germany

[73] Assignee: Voith Sulzer Finishing GmbH, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/788,038

[22] Filed: Jan. 23, 1997

[30] Foreign Application Priority Data

Feb. 1, 1996 [DE] Germany ............... 196 03 652

[51] Int. Cl.⁶ .................................................. B30B 3/04
[52] U.S. Cl. .................................... 492/7; 492/16
[58] Field of Search .................... 492/7, 16, 20, 492/2, 5; 100/162 B; 162/358.3

[56] References Cited

U.S. PATENT DOCUMENTS

| 5,329,849 | 7/1994 | Roerig | 492/7 |
| 5,447,605 | 9/1995 | Roerig | 162/358.3 |
| 5,662,777 | 9/1997 | Schiel et al. | 162/358.3 |

FOREIGN PATENT DOCUMENTS

| 33 38 625 A1 | 5/1995 | Germany . |
| 296 01 742 U1 | 4/1996 | Germany . |
| 2022 775 | 12/1979 | United Kingdom . |

Primary Examiner—Irene Cuda
Attorney, Agent, or Firm—Wolf, Greenfield & Sacks, P.C.

[57] ABSTRACT

An adjustable deflection roll is illustrated and described having a rotating roll jacket, a carrier which passes axially through the roll jacket and is rotationally fixedly held at its ends in frames and at least one support element which is arranged on the carrier and exerts a support force on the inner side of the roll jacket in a pressing plane. The roll jacket is rotatably held on a bearing housing secured against rotation in the region of at least one of its axial ends by at least one bearing. The roll is of simple layout and easy to exchange in that the bearing housing is secured against rotation at the carrier at at least one roll end within the roll jacket or within an axial projection of the roll jacket.

26 Claims, 4 Drawing Sheets

ADJUSTABLE DEFLECTION ROLL

FIELD OF THE INVENTION

The invention relates to an adjustable deflection roll comprising a rotating roll jacket, a carrier which passes axially through the roll jacket and is rotationally fixedly held at its ends in frames and at least one support element arranged on the carrier at the inner side of the roll jacket and exerting a support force in a pressing plane, wherein the roll jacket is rotatably held in the region of at least one of its axial ends by at least one bearing on a bearing housing secured against rotation.

DESCRIPTION OF PRIOR ART

Such adjustable deflection rolls, which are frequently used in practice in the pressing and smoothing sections of paper making machines, are known and are in particular frequently formed as so-called self-adjusting deflection controlled rolls in which the roll jacket can be displaced by several centimeters relative to the carrier by support elements in order to open and close the press gap.

With such an adjustable deflection roll, such as is for example known from EP 0 454 951 B1, the bearing housings on which the roll jacket is rotatably held at the ends are secured against rotation by a torque stay acting at the outside on the bearing housings in order to pick up torques which are necessarily transmitted from the drive to the bearing housing in operation.

Through this type of support of the bearing housing the changing of the roll turns out to be inconvenient because it is necessary to release the connection between the torque stay and the bearing housing.

OBJECT OF THE INVENTION

The object of the invention is thus to provide an adjustable deflection roll of the initially named kind in which the torque restraint is achieved in a simple manner design-wise and the changing of the roll is not hindered by the torque stay.

BRIEF DESCRIPTION OF THE INVENTION

This object is essentially solved in accordance with the invention in that the bearing housing is secured at the carrier against rotation at at least one roll end within the roll jacket or within an axial projection of the roll jacket.

Through the support which is provided for the roll housing in the interior of the roll the adjustable deflection roll of the invention can be interchanged in simple manner without it being necessary, as in the case of the prior art, to release the torque stay from the bearing housing.

Moreover, the torque restraint takes place in advantageous manner close to the positions at which the forces which generate the torque are introduced into the bearing housing.

At least one pair of guide elements which co-operate to secure the bearing housing against rotation are expediently provided at the carrier and at a guide projection of the bearing housing extending into the ring space formed between the roll jacket and the carrier and are expediently arranged in the pressing plane, whereby the torques can be picked up by the carrier in a manner which is simple and effective design-wise. Other forms of security against rotation are however also possible between the carrier and the inner guide projection.

In advantageous manner, in accordance with a further embodiment of the invention, two pairs of co-operating guide elements are provided at diametrically opposite sides of the carrier.

In an alternative design a pair of guide elements can be provided between the carrier and the guide projection and a further pair of guide elements are preferably provided at the side of the carrier opposite to the guide elements, with the two pairs of guide elements being arranged on axially opposite sides of a gear set forming the drive for the roll jacket.

With a self-loading roll in which the bearing housing with the roll jacket are freely movable relative to the carrier essentially in the pressing plane and perpendicular to the roll axis the two pairs of guide elements also advantageously co-operate to guide the stroke movement so that an additional guidance of the bearing housing is not required.

In accordance with a preferred embodiment at least one bearing housing is however additionally axially guided in the pressing plane substantially perpendicular to the roll jacket axis at the flange of a guide ring rotatably held on the carrier. In this arrangement the guide ring is advantageously pivotally and tiltably held on the carrier by a pivot bearing with a spherical bearing surface, so that the guide ring can movement of the roll jacket even with a deflection of the carrier in operation.

The axial centers of the toothed drive arrangement for the roll jacket, of a bearing rotatably holding the roll jacket at the bearing housing and of the spherical support of the guide ring, preferably lie essentially in a common plane extending perpendicular to the roll axis. This arrangement prevents torques arising in operation which could act disadvantageously on the toothed engagement, so that the toothed flanks can ideally contact one another in the context of the bearing clearances in the main bearings.

Furthermore, damping devices effective to damp relative movements between the carrier and the roll jacket can be provided at the roll ends between the carrier and the roll jacket or the axial projection of the roll jacket, with relative movements between the roll jacket and the carrier due to oscillation being effectively reduced in operation by the damping devices, so that the working life of the roll coatings and also of felt webs which pass through the press gap are increased and the rolled products can be made more uniform.

In accordance with an embodiment of the invention at least one damping device has at least one damping element provided within the roll between the roll jacket or the axial projection of the roll jacket and the carrier. As an alternative it is however also possible to provide the damping element outside of the roll and to pick up relative movements between the roll jacket and the carrier by the piston in cylinder arrangement in the damping device and to conduct this on to the damping element via a hydraulic line, whereby the constructional complexity within the roll can be kept small.

The damping element, or the piston in cylinder element of the damping device, is expediently provided between the axial projection of the roll jacket and a carrier spigot which tapers relative to the central region of the carrier, where adequate space is available.

The damping elements or the piston in cylinder arrangement of the damping devices are advantageously braced at least partially between the carrier and a guide projection extending into the intermediate space between the carrier and the roll jacket, with the guide projection being coupled to the roll jacket via bearings in a manner in conformity with the stroke, i.e. between two non-rotating components, so that the damping elements or the piston in cylinder arrangements can be relatively simply laid out and it is moreover possible to control the damping during the operation of the roll.

In accordance with a preferred embodiment the roll jacket is in this respect rotatably journalled in the region of at least one of its axial ends on a bearing housing which is secured against rotation and is freely movable relative to the carrier perpendicular to the roll axis in the pressing plane, with the guide projection being formed on the bearing housing.

Different damping elements can be used such as for example displacement dampers, squeeze action dampers or friction dampers which include a piston in cylinder arrangement with a cylinder at least partly filled with a hydraulic fluid and a piston engaging into the cylinder and having axial through-openings.

It can be sufficient to provide damping elements only at the roll ends. In accordance with an advantageous embodiment of the invention additional damping elements are provided between the support elements by which the roll jacket is supported relative to the carrier. The piston is then pressed by a spring against the inner side of the roll jacket and attention must be paid to ensuring adequate lubrication there. It is above all ensured that the piston is always in force transmitting engagement with the roll jacket. Through this arrangement a broad band damping is achieved over the length of the carrier.

Moreover, a piston in cylinder arrangement can be provided between the carrier and the roll jacket, or its axial projection, or the guide projection of the bearing housing, in order to relieve the roll jacket from weight forces acting outside of the working width of the roll jacket and/or to load or relieve the jacket ends to influence the pressing force distribution in the press gap by controlled pressure fluid loading, and/or to lock the roll jacket in a position spaced from a counter roll by blocking the pressure fluid return flow out of the piston in cylinder arrangement.

With respect to further advantageous embodiments of the invention reference should be made to the subordinate claims.

BRIEF LISTING OF THE DRAWINGS

The invention will now be described in more detail by way of example only with reference to the preferred embodiments and to the drawings, in which are shown:

FIG. 1 the drive end of a first embodiment of an adjustable deflection roll in accordance with the invention seen in longitudinal section and having a roll jacket which is freely adjustable relative to the carrier, FIG. 2 the drive end of a variant of the embodiment of the adjustable deflection roll in accordance with the invention shown in FIG. 1, as seen in longitudinal section, FIG. 3 the drive end of a second embodiment of an adjustable deflection roll in accordance with the invention as seen in longitudinal section with a roll jacket which is freely movable relative to the carrier, and FIG. 4 the adjustable deflection roll shown in FIG. 3 with a roll jacket which is fixed at its axial ends, i.e. non-adjustable in the radial direction of the roll and which is rotationally journalled on the carrier.

DESCRIPTION OF PREFERRED EMBODIMENTS

Figure 1:
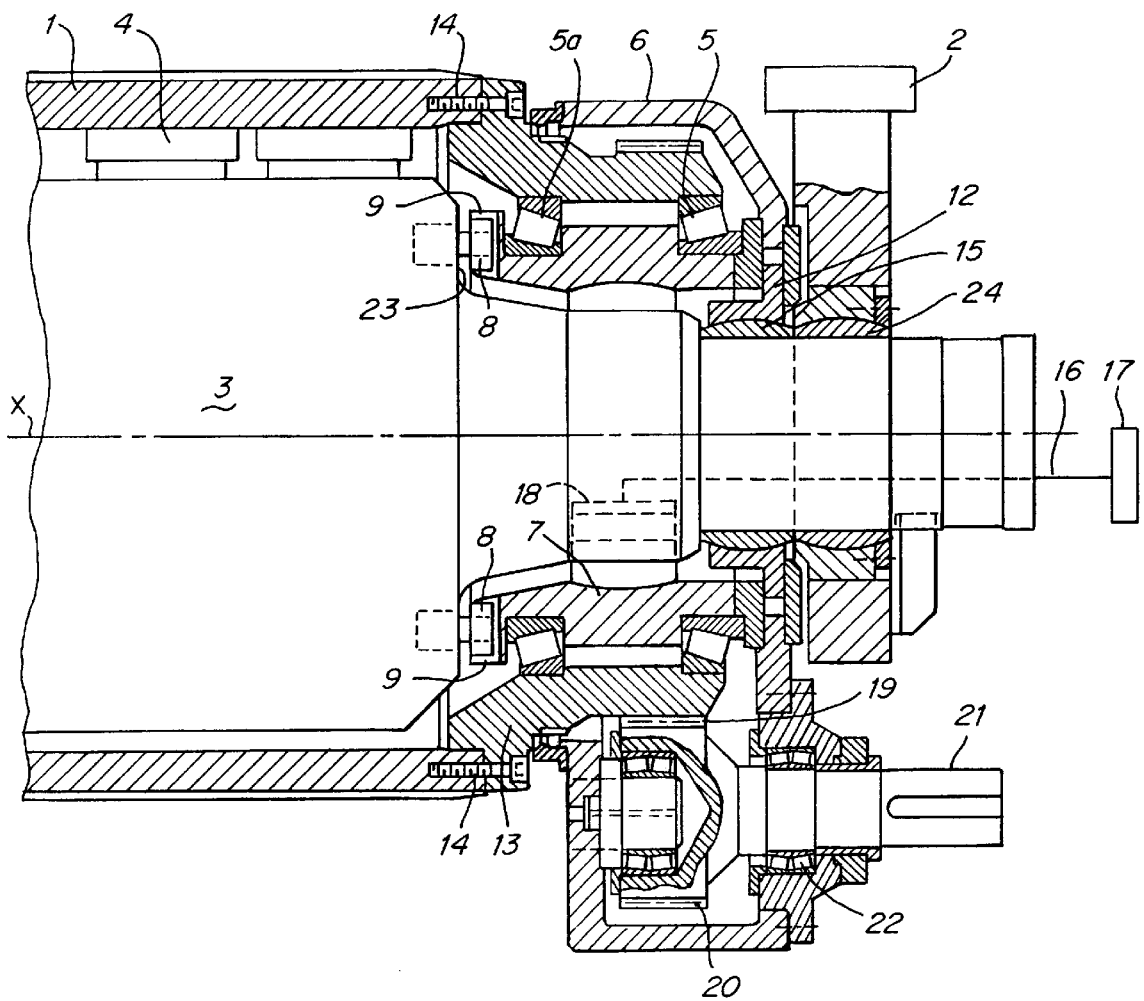
Figure 2:
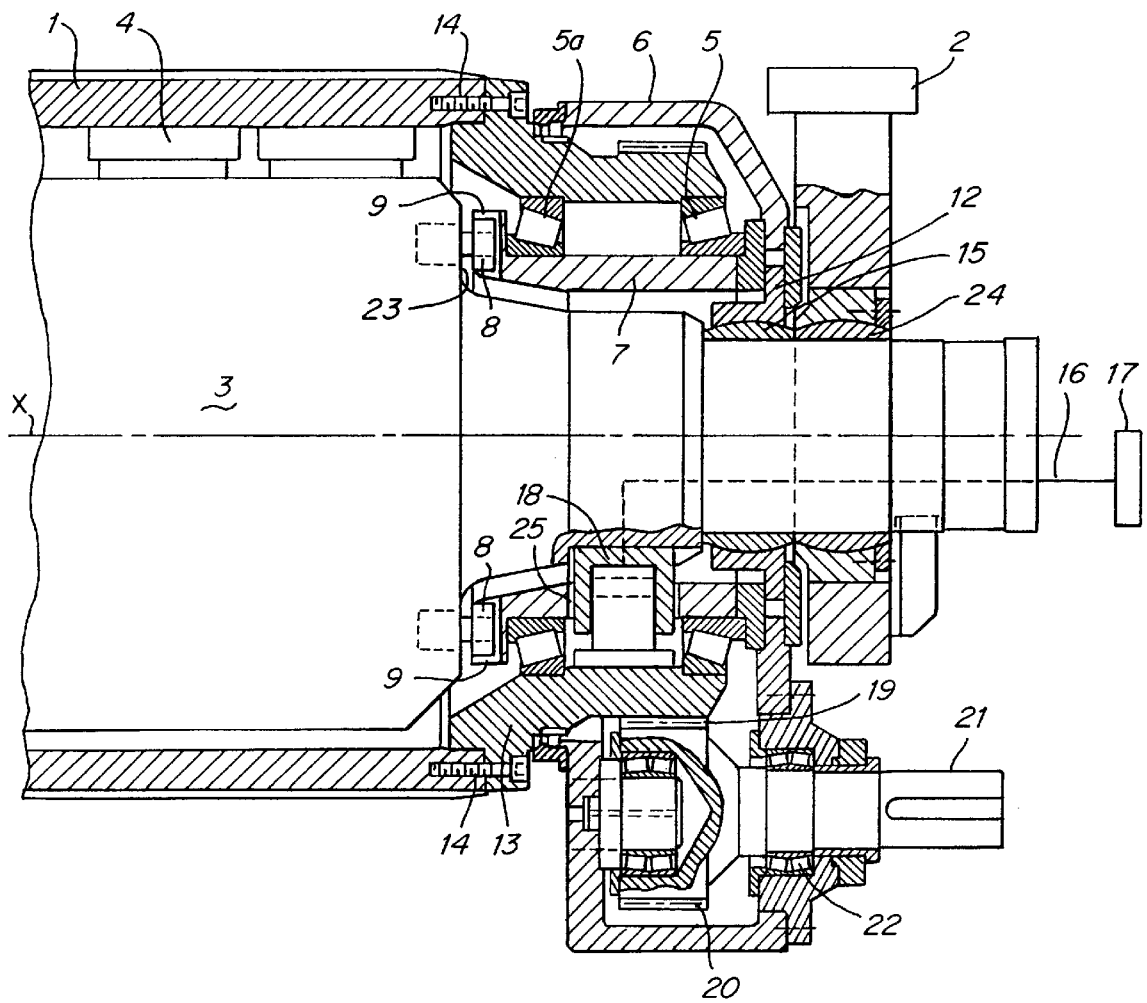

The FIGS. 1 and 2 show two variants of a first embodiment of a deflection controlled roll in accordance with the invention in longitudinal section. The deflection controlled roll includes a rotating roll jacket 1 and a carrier or yoke 3 which passes axially through the roll jacket 1 and is held at its end on a frame 2 by self-aligning bearing 24. A plurality of independently controllable hydrostatic or hydrodynamic support elements 4 are arranged alongside one another on the carrier 3 in the axial direction X of the roll and exert a support force onto the inner side of the roll jacket 1 in a pressing plane.

The roll jacket 1 has at each of its ends an axial projection 13 which is secured by bolts 14 directly to the end face of the roll jacket 1. The roll jacket 1 is rotatably journalled in the region of its axial projection 13 by rolling element bearings 5, 5a on a guide projection 7 of a bearing housing 6. The guide projection extends into the ring space formed between the carrier 3 and the roll jacket 1.

At the drive end of the adjustable deflection roll shown in FIGS. 1 and 2 a toothed ring 19 is provided at the outer side of the axial projection 13 of the roll jacket 1 and meshes with a drive pinion 20 of a drive whose pinion shaft 21 extends parallel to the roll axis X and is journalled by rolling element bearings 22 in the bearing housing 6.

The roll is formed as a self-loading adjustable deflection roll, i.e. the roll jacket 1 is freely movably arranged relative to the carrier 3 in the pressing plane of the support elements 4 for movement perpendicular to the roll axis X. For the guidance of this movement two guide grooves 9 are provided in the pressing plane on the guide projection 7, on which the roll jacket 1 is rotatably journalled, on opposite sides of the carrier 3, and two spigots 8 are provided at an end face 23 of the carrier 3 and stand in engagement with the guide grooves 9 for the guidance of the bearing housing 6.

The spigot/guide groove arrangements 8, 9 not only guide the bearing housing 6 in the pressing plane perpendicular to the roll axis X but also support the bearing housing 6 against a rotation about the roll axis X.

For the axial guidance of the stroke movement of the bearing housing 6 at the carrier 3 a guide ring 12 is furthermore attached to the carrier 3 by a self-aligning bearing 15. The guide ring is axially fixed but tiltably and rotatably mounted on the carrier 3. Moreover, the guide ring 12 has at the outer side, two parallel guide surfaces arranged opposite to one another with respect to the ring axis and parallel to the direction of adjustment of the bearing housing 6.

The guide ring 12 engages into a guide slot provided in the bearing housing 6 and co-operates with the latter for the guidance of the bearing housing 6.

A respective damping device is provided at each of the two roll ends and is active between the carrier 3 and the roll jacket 1 for the damping of relative movements which can arise between the carrier 3 and the roll jacket 1 in operation as a result of resonant oscillations occurring in the paper machine.

In the first embodiment of an adjustable deflection controlled roll in accordance with the invention shown in FIG. 1 a piston in cylinder arrangement 18 belongs to the damping device and is braced between the carrier 3 and the guide projection 7 of the bearing housing 6. The guide projection 7 extends into the ring space between the carrier 3 and the roll jacket 1. The damping device incorporating the piston in cylinder arrangement picks up the relative movements between the roll jacket 1 and the carrier 3 and conducts them via a pressure fluid line 16 to a damping element 17 provided outside of the roll. The damping element 17 can be formed in a manner known per se as a displacement damper, as a squeeze oil damper or as a friction damper.

The piston in cylinder arrangement 18 also serves to relieve the roll jacket from weight forces which act outside of the working roll jacket, and/or to load or relieve the jacket ends in order to influence the pressing force distribution and the press gap by controlled pressure fluid loading, and/or to lock the roll jacket in a position raised from a counter-roll by blocking off the pressure fluid return flow from the piston in cylinder arrangement.

The bracing of the piston in cylinder arrangement 18 provided between two non-rotating components has the advantage that the piston in cylinder arrangement can be laid out relatively simply.

Moreover, it is possible to influence the damping functions of the damping device in the operation of the roll, i.e. to optimize it.

The piston in cylinder arrangement 18 can in an alternative manner also extend between the carrier 3 and the axial projection 13 of the roll jacket 1 as in the adjustable deflection roll shown in FIG. 2, with it extending through an opening 25 in the guide projection of the bearing housing 6. In this case the piston in cylinder arrangement 18 is formed as a hydrostatic or hydrodynamic support element in order to enable low friction sliding at the rotating roll jacket 1.

Figure 3:
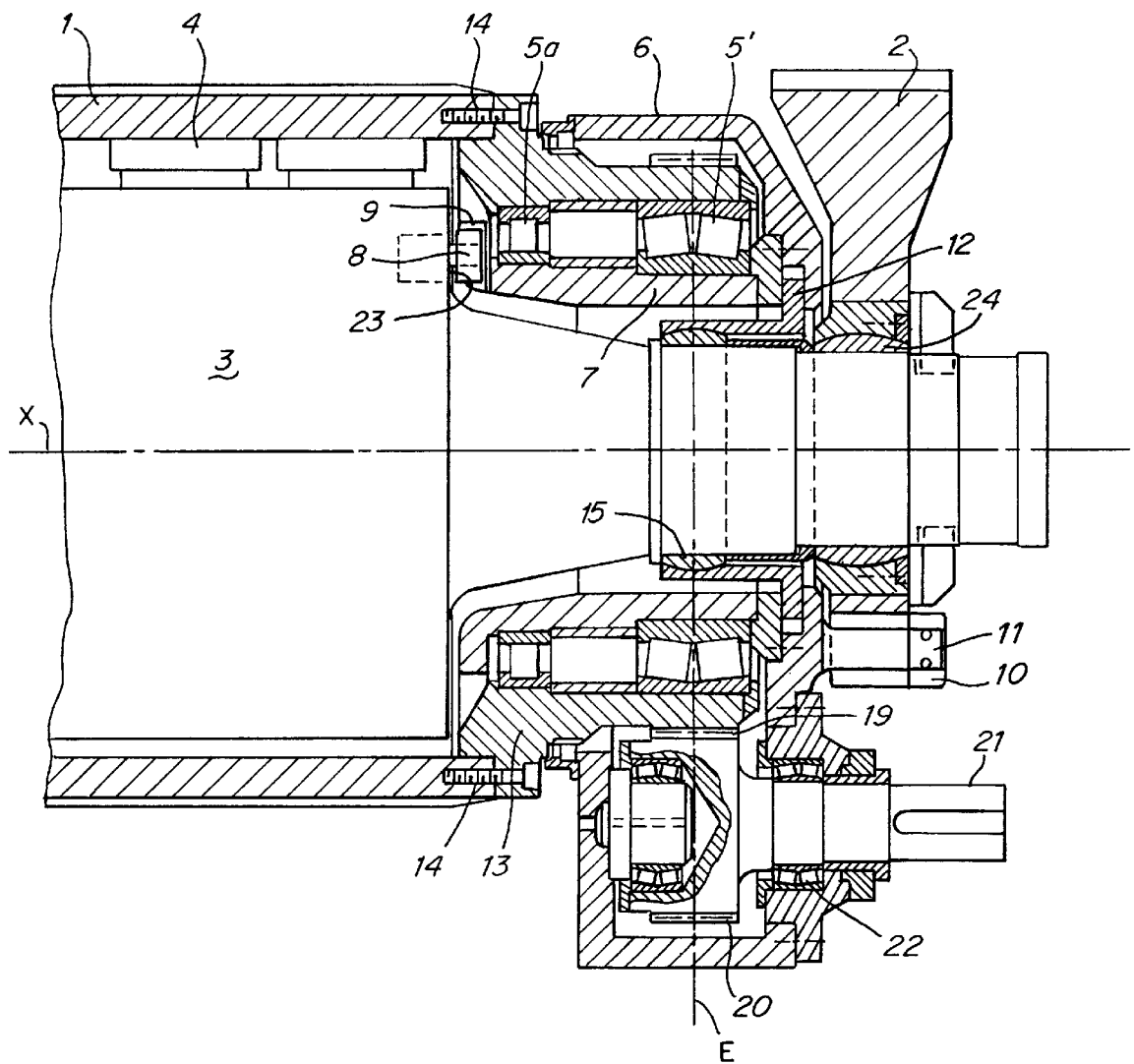

FIG. 3 shows a third embodiment of an adjustable deflection roll in accordance with the invention. This adjustable deflection roll has the same basic layout as the previously explained adjustable deflection roll shown in FIGS. 1 and 2. It includes a carrier 3 which is held stationary in a frame 2, and a rotatable roll jacket 1, which is supported relative to the carrier 3 by support elements 4. The rotatable roll jacket 1 is journalled by a self-aligning roller bearing 5' and a single row roller bearing 5a at its axial ends, at the inside on a guide projection 7 of a bearing housing 6. The bearing housing 6 is secured against rotation and is adjustable in the pressing plane perpendicular to the roll axis X.

For the guidance of the adjustment movement of the bearing housing a guide groove 9 is provided inside of the roll jacket 1 on the guide projection 7 and a spigot 8 which engages into the guide groove 9 is provided at an end face 23 of the carrier 3.

At the end of the carrier 3 remote from the guide elements 8, 9 the bearing housing 6 is additionally secured against rotation and guided outside of the roll jacket 1 by guide elements 10, 11 provided at the frame 2 and at the bearing housing 6.

Since the two pairs of guide elements 9, 10; 11, 12 are provided on opposite sides of the carrier 3 (i.e. above and beneath it) and at axially opposite sides of the gear set 19, 20 forming the drive an ideal support and guidance of the bearing housing 6 is achieved.

For the axial guidance of the bearing housing 6 there is furthermore provided a guide ring 12 which is rotatably and tiltably journalled on the carrier 3 by a pivot bearing 15. The pivot bearing 15 has a spherical bearing surface so that the guide ring can adjust itself substantially freely relative to the carrier 3, and thus adjusts its position independently of the deflection of the carrier 3. The guide ring 12 engages into a guide slot of the bearing housing 6 and has guide surfaces at its outer side which co-operate with the guide slot for the guidance of the bearing housing 6.

As FIG. 3 shows the axial center points of the ring gear 19 of the double roller bearing 5 which represents the main bearing and the spherical bearing of the guide ring 12 lie in a common plane E extending perpendicular to the roll axis X whereby a situation is achieved such that in operation no disadvantageous moments can arise and thus the tooth meshing between the ring gear 19 and the drive pinion 20 is not impaired.

In this embodiment the guide ring 12 also forms a radial abutment for the adjustment movement of the bearing housing 6 in the pressing plane, with the bearing housing 6 contacting the radial abutment in operation, whereby in operation a direct journalling of the roll jacket 1 on the carrier is effectively achieved.

In the adjustable deflection rolls shown in FIGS. 1 to 3 the support elements 4 are active for the adjustment of the roll jacket 1 relative to the carrier, whereby the roll jacket 1 can be raised or lowered. The guidance of this adjustment movement of the roll jacket takes place at the roll ends via the bearing housings 6. The bearing houses 6 are secured by the spigot/guide groove arrangements 8, 9; 10, 11 against rotation and are guided perpendicular to the roll axis X in the pressing plane. They are additionally secured by the guide ring 12 at the carrier 3 against lateral displacement.

The guide ring 12 is rotatable and in the embodiment shown in FIG. 3 is also tiltable relative to the carrier 3. Accordingly, it can always adopt the ideal position for the guidance of the respective bearing housing 6 independently of the deflection of the roll, so that, for example, jamming in the range of guidance is precluded.

In these arrangements, relative movements occurring between the roll jacket 1 and the carrier 3 as a result of oscillations are effectively reduced by the damping elements 17 so that the working life of the roll coatings and of the felt webs which run through the press gap are increased and the manufactured paper webs can be made more uniform.

Figure 4:
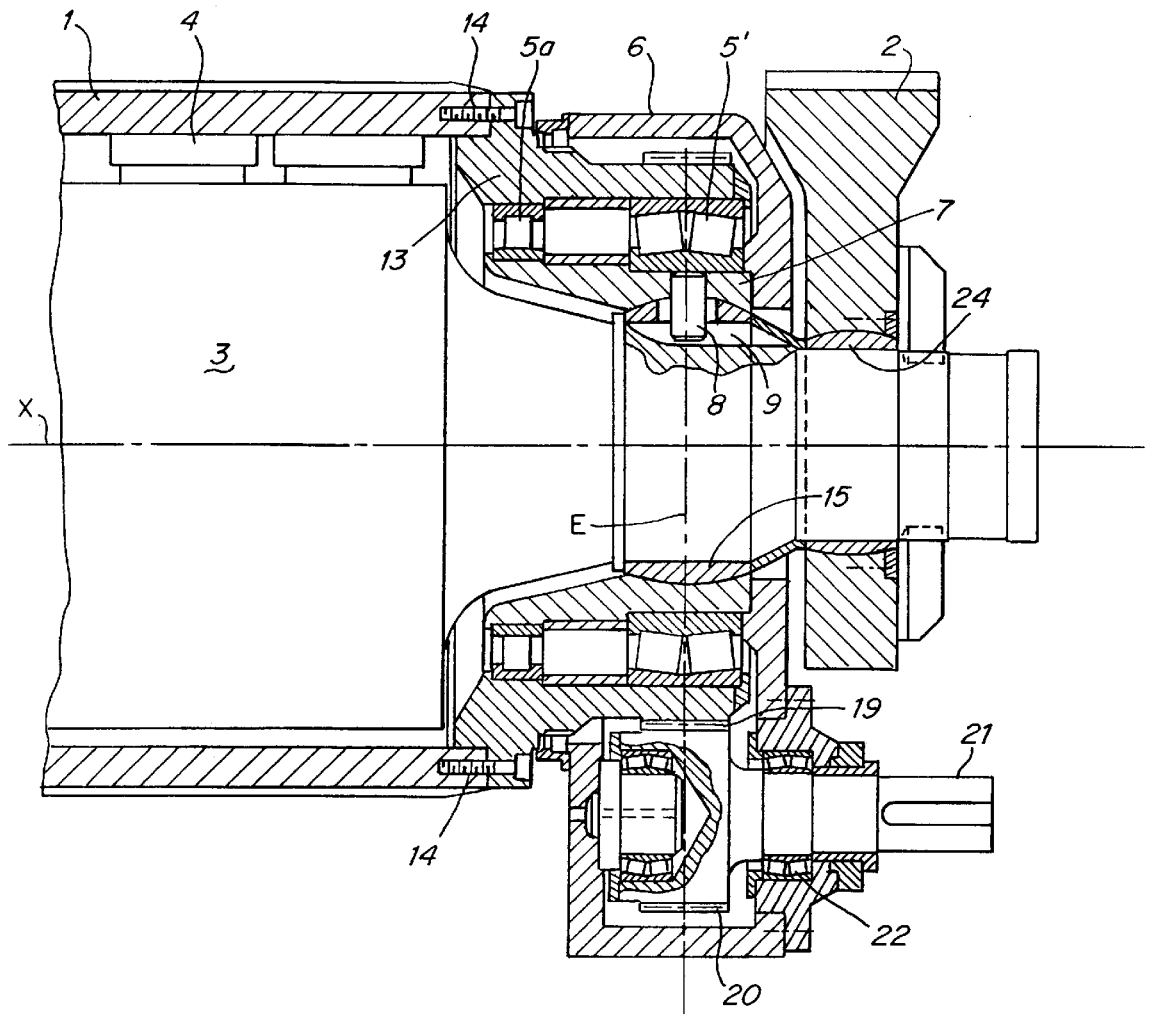

FIG. 4 shows an adjustable deflection roll which is built up in the same way as the adjustable deflection roll shown in FIG. 3. However, the roll jacket 1 is not freely adjustable relative to the carrier 3 but is rather firmly held at its ends on the carrier 3, i.e. immovably in the radial direction. The roll jacket 1 is journalled on the carrier 3 by a pivot bearing 15 which is pushed onto the carrier 3. The pivot bearing 15 has a spherical bearing surface on which the guide projection 7 of the bearing housing 6 is tiltably journalled.

In order to prevent rotation of the bearing housing 6 in operation a spigot 8 is provided in the guide projection 7 and passes through the pivot bearing 15 and engages into a guide groove 9 provided in the carrier 3.

In all embodiments the design of the other end of the carrier and roll assembly and its connection to the roll frame can be realized similarly to the design at the driven end, for example, simply by omitting the elements associated with the driving of the roll. The guide ring can also be omitted with advantage at the non-driven end to avoid a "fight" between two guide rings, e.g. in the event of differential thermal expansion. If desired, the roll may be driven at both ends. The other end of the carrier and roll assembly and its connection to the roll frame can, however, also be realised differently from the design at the drive end, if required. In particular it may be desirable to permit one end of the carrier and roll assembly to move freely in the axial direction to take account of differential thermal expansion. This could, for example, be achieved by designing the self-aligning barrier 24 and/or the self-aligning bearing 15 so that the self-aligning ring element can slide axially on an inner bearing ring. This would allow for symmetrical loading of the roll.

REFERENCE NUMERAL LIST

1 roll jacket
2 frame
3 carrier
4 support element
5 bearing
5' bearing 5a bearing
6 bearing housing
7 housing projection
8 guide element
9 guide element
10 guide element
11 guide element
12 guide ring
13 axial projection
14 bolt
15 pivot bearing
16 pressure fluid line
17 damping element
18 piston in cylinder arrangement
19 toothed ring
20 drive pinion
21 pinion shaft
22 rolling element bearing
23 end face
24 self-aligning bearing
25 opening
X roll axis
E plane

We claim:

1. Adjustable deflection roll comprising a rotating roll jacket (1), a carrier 3 which passes axially through the roll jacket (1) and is rotationally fixedly held at its ends in frames (2), and at least one support element (4) arranged on the carrier (3) at the inner side of the roll jacket (1) and exerting a support force in a pressing plane, wherein the roll jacket (1) is rotatably held in the region of at least one of its axial ends by at least one bearing (5, 5a) on a bearing housing (6) secured against rotation, wherein the bearing housing (6) is secured at the carrier (3) against rotation at at least one roll end within the roll jacket (1), or within an axial projection (13) of the roll jacket (1), and wherein at least one pair of guide elements (8, 9) which co-operate to secure the bearing housing (6) against rotation is provided at the carrier (3) and at a guide projection (7) of the bearing housing (6) which extends into an intermediate space formed between the carrier (3) and the roll jacket (1) or the axial projection (13).

2. Adjustable deflection roll in accordance with claim 1, characterized in that the guide elements (8, 9) are substantially arranged in the pressing plane.

3. Adjustable deflection roll in accordance with claim 1 or claim 2, characterized in that two pairs of co-operating guide elements (8, 9) are provided on diametrically oppositely disposed sides of the carrier (3).

4. Adjustable deflection roll comprising a rotating roll jacket (1), a carrier 3 which passes axially through the roll jacket (1) and is rotationally fixedly held at its ends in frames (2), and at least one support element (4) arranged on the carrier (3) at the inner side of the roll jacket (1) and exerting a support force in a pressing plane, wherein the roll jacket (1) is rotatably held in the region of at least one of its axial ends by at least one bearing (5, 5a) on a bearing housing (6) secured against rotation, wherein the bearing housing (6) is secured at the carrier (3) against rotation at at least one roll end within the roll jacket (1), or within an axial projection (13) of the roll jacket (1), and Wherein a pair of guide elements (8, 9) is provided between the carrier (3) and the guide projection (7) and in that a further pair of guide elements (10, 11) is preferably provided at the side of the carrier (3) opposite to the guide elements (8, 9), with the two pairs of guide elements (8, 9; 10, 11) being arranged on axially oppositely disposed sides of gear set (19, 20) forming the drive for the roll jacket (1).

5. Adjustable deflection roll comprising a rotating roll jacket (1), a carrier 3 which passes axially through the roll jacket (1) and is rotationally fixedly held at its ends in frames (2), and at least one support element (4) arranged on the carrier (3) at the inner side of the roll jacket (1) and exerting a support force in a pressing plane, wherein the roll jacket (1) is rotatably held in the region of at least one of its axial ends by at least one bearing (5, 5a) on a bearing housing (6) secured against rotation, wherein the bearing housing (6) is secured at the carrier (3) against rotation at at least one roll end within the roll jacket (1), or within an axial projection (13) of the roll jacket (1), and Wherein the bearing housing (6) is substantially freely movable relative to the carrier (3) essentially in the pressing plane and perpendicular to the roll axis; and in that the guide elements (8, 9; 10, 11) co-operate to guide the stroke movement/displacement movement.

6. Adjustable deflection roll in accordance with claim 1, characterized in that spigots (8, 11) and/or rings rotatably arranged thereon and guide grooves (9, 10) which stand in engagement with them are provided as the guide elements (8, 9; 10, 11).

7. Adjustable deflection roll in accordance with claim 5, characterized in that at least one bearing housing (6) is guided in a straight line, perpendicular to the roll axis in the pressing plane on a guide ring (12) which is rotatably held on the carrier and which preferably has a guide flange at the outer side.

8. Adjustable deflection roll in accordance with claim 7, characterized in that the guide ring (12) is rotatably and pivotally held on the carrier (3) by a pivot bearing (15), in particular a pivot bearing (15) having a spherical bearing surface.

9. Adjustable deflection roll in accordance with claim 5, characterized in that the roll jacket (1) or its axial projection (13) has a ring gear (19) at the outside at one axial end; and in that the axial centers of the ring gear (19), of the bearing (5') which rotatably holds the roll jacket (1) on the bearing housing (6) and of the spherical support of the guide ring (12) lie substantially in a common plane (E) perpendicular to the roll axis (X).

10. Adjustable deflection roll in accordance with claim 5, characterized in that the guide ring (12) serves as an abutment for the adjustment movement of the bearing housing (6) in the pressing plane, with the bearing housing (6) contacting the abutment in the operation of the roll.

11. Adjustable deflection roll in accordance with claim 5, characterized in that at least one piston in cylinder arrangement (18) is provided between the carrier (3) and the roll jacket (1), or its axial projection (13), or the guide projection (7) of the bearing housing (6), in order to relieve the roll jacket (1) from weight forces acting outside of the working width of the roll jacket (1) and/or to load or relieve the jacket ends in order to influence the pressing force distribution in the press gap by controlled pressure fluid loading and/or in order to lock the roll jacket (1) in a position separated from a counter-roll by blocking the pressure fluid return flow out from the piston in cylinder arrangement (18).

12. Adjustable deflection roll in accordance with claim 5, characterized in that at least one damping device active to damp relative movements between the carrier (3) and the roll jacket (1) is provided at at least one of the roll ends between the roll jacket (1) or the axial projection (13) of the roll jacket (1) and the carrier (3).

13. Adjustable deflection roll in accordance with claim 12, characterized in that damping devices are provided at both roll ends.

14. Adjustable deflection roll in accordance with claim 12, characterized in that at least one damping device is provided and has at least one damping element (17) provided between the roll jacket (1) or the axial projection (13) of the roll jacket (1) and the carrier (3).

15. Adjustable deflection roll in accordance with claim 12, characterized in that at least one damping device is provided and has a damping element (17) provided outside of the roll; and in that relative movements between the roll jacket (1) and the carrier (3) are picked up by a piston in cylinder arrangement (18) and conducted on to the damping element (17) via a hydraulic line.

16. Adjustable deflection roll in accordance with claim 14, characterized in that the damping element (17) or the piston in cylinder arrangement (18) of at least one damping device is located between the axial projection (13) of the roll jacket (1) and a carrier spigot tapered relative to the central region of the carrier (3).

17. Adjustable deflection roll in accordance with claim 15, characterized in that the damping element (17) or the piston in cylinder arrangement (18) of at least one damping device is located between the axial projection (13) of the roll jacket (1) and a carrier spigot tapered relative to the central region of the carrier (3).

18. Adjustable deflection roll in accordance with claim 14, characterized in that the roll jacket (1) is held at the bearing housing (6) by two axially spaced apart rolling element bearings (5, 5a); and in that the damping element (17), or the piston in cylinder arrangement (18) of at least one damping device, is provided between the two rolling element bearings (5, 5a).

19. Adjustable deflection roll in accordance with claim 15, characterized in that the roll jacket (1) is held at the bearing housing (6) by two axially spaced apart rolling element bearings (5, 5a); and in that the damping element (17), or the piston in cylinder arrangement (18) of at least one damping device, is provided between the two rolling element bearings (5, 5a).

20. Adjustable deflection roll in accordance with claim 14, characterized in that the damping element (17) or the piston in cylinder arrangement (18) of at least one damping device is supported between the carrier (3) and a guide projection (7) extending in the intermediate space between the carrier (3) and the roll jacket (1) and are coupled via bearings to the roll jacket (1) in conformity with the stroke.

21. Adjustable deflection roll in accordance with claim 14, characterized in that a guide projection (7) coupled via bearings to the roll jacket (1) in conformity with the stroke engages into the intermediate space between the carrier (3) or the carrier spigot and the roll jacket (1) or the axial projection (13) of the roll jacket (1); and in that the damping element (17) or the piston in cylinder arrangement (18) of at least one damping device passes through the guide projection (7) and acts directly on the inner side of the roll jacket (1) or of the projection (13).

22. Adjustable deflection roll in accordance with claim 21, characterized in that, in order to overcome the relative movement between the static damping element (17) and the rotating roll jacket (1) or the axial projection (13), hydrostatic pockets are provided in the damping element (17), or in the piston in cylinder arrangement (18), via which a continuous lubricant flow takes place which is co-used by restriction for the damping action.

23. Adjustable deflection roll in accordance with claim 18, characterized in that the roll jacket (1) is rotatably journalled on a bearing housing (6) in the region of at least one of its axial ends and is freely movable relative to the carrier (3) perpendicular to the roll axis in the pressing plane; and in that the guide projection (7) is formed on the bearing housing (6).

24. Adjustable deflection roll in accordance with claim 12, characterized in that the damping elements (17) are at least partially formed as a displacement or squash oil damper.

25. Adjustable deflection roll in accordance with claim 12, characterized in that the damping elements (17) are at least partly formed as frictional dampers.

26. Adjustable deflection roll in accordance with claim 12, characterized in that the roll jacket (1) is supported relative to the carrier (3) by a plurality of support elements (4) and damper elements (17) are provided between the support elements (4).

* * * * *